May 3, 1955

E. P. HARRIS ET AL 2,707,492

FLEXIBLE TUBING

Filed Oct. 18, 1952

INVENTOR.
EDWARD P. HARRIS
BY FREDERICK W. SAMPSON their ATTORNEYS

United States Patent Office 2,707,492
Patented May 3, 1955

2,707,492

FLEXIBLE TUBING

Edward P. Harris and Frederick W. Sampson, Dayton, Ohio, assignors to General Motors Corporation, Detroit, Mich., a corporation of Delaware Application October 18, 1952, Serial No. 315,502

3 Claims. (Cl. 138—56)

This invention relates to flexible tubing and is particularly concerned with flexible tubing formed from rubber-like material and including a reinforcing wire therein.

It is, therefore, the basic object of the invention to provide an integrated rubber-like tube which is highly flexible and strong and which includes a reinforcing wire therein.

Another object of the invention is to provide a tube which may be readily flexed without buckling at the flexed portions thereof and wherein a reinforcing wire is included to maintain the shape of the tube and prevent collapse thereof.

A more specific object of the present invention is to provide a tube which may be readily flexed without buckling at the flexed portions thereof and will not have folds formed on the internal surface when the tube is so bent, and wherein a reinforcing wire is included to maintain the shape of the tube and prevent collapse thereof.

Further objects and advantages of the present invention will be apparent from the following description, reference being had to the accompanying drawing, wherein preferred embodiments of the present invention are clearly shown.

Figure 1:
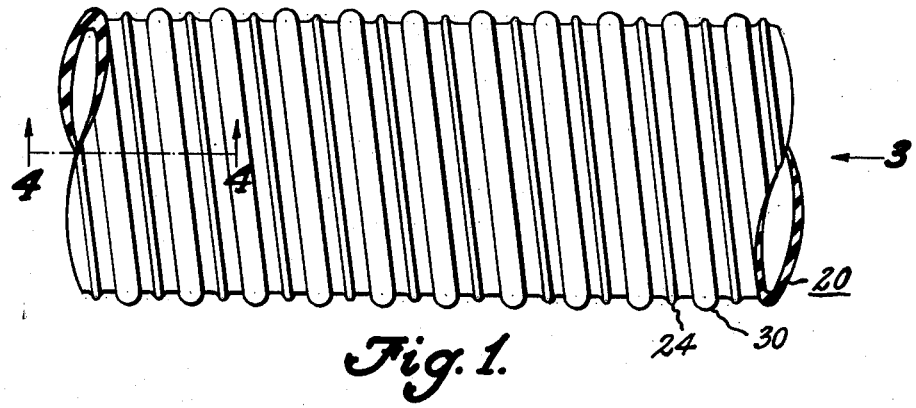
Fig. 1 is a side view of a portion of the tubing.

Tubing of the character herein may be made by the method disclosed in application S. N. 213,704 assigned to the assignee of this invention.

In this application a method is disclosed for extruding long lengths of ribbon from rubber-like elastomeric material wherein a reinforcing wire is formed into a preset curvature and is passed through the extruding die so that the rubber-like material is coated thereover. This ribbon is then wound helically on a mandrel and is cured or vulcanized for integrating the overlapping portions of the rubber-like tape into a unitary tubular structure. The reinforcing wire also runs helically through the tube for supporting the same and preventing collapse thereof.

The invention here is directed specifically to the configuration of the tubing and to the cross sectional shape of the ribbon used in the formation of the tube whereby the tube is readily flexible even to 90° bends and wherein no collapse of the tube is noted at the flexed portions thereof.

Specifically, tubing of this character may be used for defroster hose, vacuum cleaner hose, ventilating hose and a multitude of other uses wherein relatively large diameter tubing is required. In the past, tubes of this type were formed by wrapping vulcanizable tape material onto a mandrel wherein the reinforcing wire was enveloped in the overlap between adjacent turns of the tape. While this tubing is quite useful, there are many instances where buckling is apparent upon considerable bending of the tubing due to the fact that the tape material between adjacent turns of reinforcing wire is of substantially uniform thickness and, therefore, does not present an easily bendable portion. Furthermore, hose or tubing, made from wrapped tape material, is more difficult to fabricate than is the extruded type as disclosed in the aforementioned copending application.

The uniform bending of the tubing is a very desirable condition, particularly in ventilating and defroster hose wherein the buckling of the inside of the hose causes considerable friction to fluid flow by the creation of eddy currents which causes a definite length of the tubing to have a higher pressure drop therethrough than if said length of tubing is free from buckled portions. This type of tubing is set forth in application S. N. 242,355 assigned to the assignee of the present invention wherein a flexible tubing is disclosed having a smooth interior and the inherent characteristic of bending without causing buckling. This tubing is very useful in installations wherein a multiplicity of sharp bend ends are not required, for under these circumstances the small folds in the interior of the tubing formed because of the bending will cause considerable friction to fluid flow.

The tubing of the present invention is particularly useful in installations wherein a multitude of sharp bends is required. The small individual folds in the tube wall occasioned by bending will be formed on the exterior of the tube and thus present a relatively smooth interior surface to the flow of the fluid.

Figure 2:
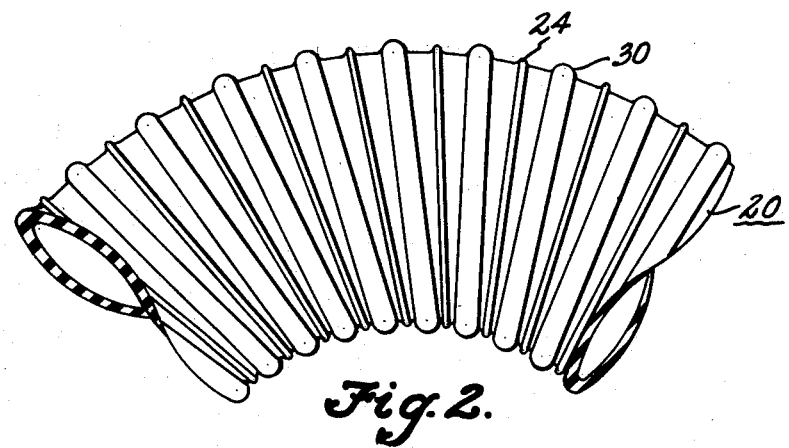
Fig. 2 is a view of the tubing shown in Fig. 1 flexed to a curved form.
Figures 3, 5:
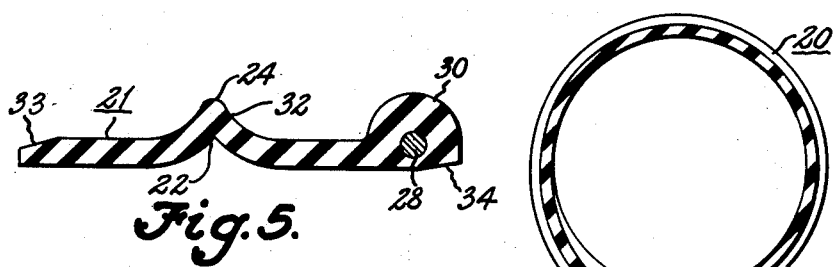
Fig. 3 is an end view of the tubing shown in Fig. 1, depicting the springy nature of the reinforcing wire which maintains the tube in shape.
Fig. 5 is a view in section of the tape used in the manufacture of the tubing.
Figure 4:
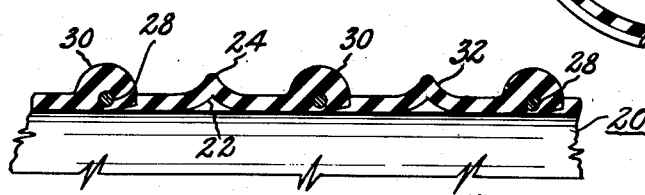
Fig. 4 is a fragmentary sectional view of the tubing taken on line 4—4 of Fig. 1.

Referring specifically to the drawing a length of tubing which forms the basis of our invention is shown at 20. This tubing 20 is shown in bent portion in Fig. 2, and it will be noted that a smooth curvature is present at the minor diameter portion of the bend. This is occasioned by the inclusion of a spirally disposed weakened portion 32 as noted in the ribbon 21 as shown in Fig. 5. This weakened portion is formed by a valley portion 22 along the interior of the tube. A spirally formed ridge 24 is formed on the exterior of the tube and is transversely aligned with the valley portion 22. The valley 22 and the rib 24 are formed so as to have the tube wall at the apex of the valley of relatively less thickness than the rest of the tube thereby forming a spirally weakened portion on the tube surface. A reinforcing wire 28 is included in a second longitudinally disposed ridge 30. The ridge 30 is formed to completely envelope the reinforcing wire 28 and provide sufficient material therearound to prevent break-through during the formation of the tube. Preferably, the opposed edges of the ribbon 21 are provided tapered portions 33 and 34 at opposite sides thereof so that when the ribbon 21 is wrapped spirally on a mandrel (not shown) the tapered portions 33 and 34 interfit as shown in Fig. 4 to form a smooth joint between adjacent turns of the ribbon 21 on the mandrel. After curing, the tubing 20 is readily slipped off the mandrel due to the fact that the reinforcing wire 28 of spring material has a tendency to enlarge. This is clearly shown in Fig. 3 wherein a cut-off section at the end of a piece of tubing 20 is shown wherein the end of the wire 28 springs outwardly against the restraint of the rubber-like material of the tube. Thus the springy reinforcing wire 28 tends to enlarge the tubing circumferentially on the mandrel whereby it is easy to slip the same therefrom. This outward springing tendency of the reinforcing wire 28 has still another function, namely, that of maintaining the tube in cylindrical form at all times.

The valley portion 22 formed in the ribbon 21 is an important portion of our invention. This valley portion is of slightly less thickness than the ribbon 21 and presents a spiral groove in the finished tubing which is weaker than the remainder of the tube and is bounded on either side by an increased thickness of material so that when a bend in the tubing occurs the excess material tends to flow into the valley portion 22. This results in a smooth bend with no buckling at the minor diameter portion of the bend and likewise presents a readily stretchable part at the major diameter portion of the bend whereby the inner surface of the bent tubing is relatively smooth and presents little restriction to fluid flow therethrough, and the exterior surface has excess material formed into a plurality of folds along the minor diameter.

It may be said here that various designs of tubing have been made and that when the valley portion is not substantially centrally located in the ribbon 21 and when the tube is not weakened at the valley portion a smooth bend is not forthcoming since the buckling and internal folding tendency prevails. In other words, the cross-sectional design of the ribbon 21 as used to form the tube 20 is of considerable importance to the formation of a suitable bendable tube having a relatively smooth internal surface when the tube is bent into a sharp angle.

While the embodiments of the present invention as herein disclosed, constitute preferred forms, it is to be understood that other forms might be adopted.

What is claimed is as follows:

1. In a flexible elastomeric tube made from spirally wrapped tape, the combination comprising: a spirally disposed external rib enlargement continuously extending along the outer surface of said tube, wire reinforcing member embedded within said enlargement and a spirally disposed crease continuously extending along the outer surface of said tube wall and defining a weakened portion in said tube wall wherein the thickness of the tube wall at said weakened portion is less than the thickness of the wall of the remainder of the tube walls, said crease being laterally spaced from said rib enlargement and adapted to permit said tube to be bent without forming buckles on the interior thereof.

2. In a flexible tube made from spirally wrapped elastomeric tape, the combination comprising: a pair of spirally disposed continuously extending external enlargements, a wire reinforcement member spirally formed and normally having a free diameter greater than said tube and embedded within one of said enlargements and a spirally disposed groove complementary in shape and having its apex aligned with the other of said enlargements and disposed in the internal surface of said tube, said groove being of a sufficient depth to reduce the thickness of the tube at the apex of said groove to less than the thickness of the remainder of the walls of said tube and adapted to permit said tube to be bent without forming buckles on the interior surfaces thereof.

3. In a flexible elastomeric tube made from spirally wrapped tape, the combination comprising: spirally disposed continuously extending rib enlargements, wire reinforcing member embedded within one of said enlargements and a spirally disposed groove complementary in shape and having an apex aligned with the other of said enlargement disposed on the internal surface of said tube of a sufficient depth to reduce the thickness of the tube at the apex of said groove to less than the thickness of the remainder of the walls of said tube and for permitting said tube to be bent over a sharp angle without forming buckles on the interior surfaces thereof.

References Cited in the file of this patent

UNITED STATES PATENTS

| | | |
|---|---|---|
| 2,452,047 | Hamblin | Oct. 26, 1948 |
| 2,524,522 | Gilmore et al. | Oct. 3, 1950 |
| 2,622,623 | Michaudet | Dec. 23, 1952 |